(12) United States Patent
Sheard et al.

(10) Patent No.: US 9,395,187 B2
(45) Date of Patent: Jul. 19, 2016

(54) PORTABLE DEVICE FOR DETERMINING AZIMUTH

(71) Applicant: Atlantic Inertial Systems Limited, Devon, Plymouth (GB)

(72) Inventors: John Keith Sheard, Plymouth (GB); Nicholas Faulkner, Plymouth (GB)

(73) Assignee: ATLANTIC INERTIAL SYSTEMS LIMITED, Devon, Plymouth (GB)

(*) Notice: Subject to any disclaimer, the term of this patent is extended or adjusted under 35 U.S.C. 154(b) by 0 days.

(21) Appl. No.: 14/327,679

(22) Filed: Jul. 10, 2014

(65) Prior Publication Data

US 2015/0019129 A1   Jan. 15, 2015

(30) Foreign Application Priority Data

Jul. 10, 2013  (GB) .................................. 1312368.2

(51) Int. Cl.
| | |
|---|---|
| *G01C 21/00* | (2006.01) |
| *G01C 15/00* | (2006.01) |
| *G01C 17/00* | (2006.01) |
| *G01C 21/10* | (2006.01) |
| *G01S 19/39* | (2010.01) |
| *G01S 19/53* | (2010.01) |
| *G01S 19/54* | (2010.01) |
| *G01S 19/35* | (2010.01) |
| *G01C 19/38* | (2006.01) |

(52) U.S. Cl.
CPC .............. *G01C 21/005* (2013.01); *G01C 15/00* (2013.01); *G01C 17/00* (2013.01); *G01C 19/38* (2013.01); *G01C 21/10* (2013.01); *G01S 19/35* (2013.01); *G01S 19/39* (2013.01); *G01S 19/53* (2013.01); *G01S 19/54* (2013.01)

(58) Field of Classification Search
CPC ...... G01C 21/005; G01C 21/10; G01C 17/00; G01C 15/00; G01S 19/35; G01S 19/54; G01S 19/39
USPC ......................................................... 701/472
See application file for complete search history.

(56) References Cited

U.S. PATENT DOCUMENTS

| | | | |
|---|---|---|---|
| 7,610,166 B1 | 10/2009 | Solinsky | |
| 8,151,640 B1 | 4/2012 | Kubena | |
| 2007/0010965 A1* | 1/2007 | Malchi et al. ................. | 702/151 |
| 2008/0036652 A1* | 2/2008 | Shore et al. ............... | 342/357.06 |
| 2008/0154495 A1 | 6/2008 | Breed | |
| 2009/0037033 A1 | 2/2009 | Phillips et al. | |
| 2011/0029277 A1* | 2/2011 | Chowdhary et al. .......... | 702/150 |

FOREIGN PATENT DOCUMENTS

| | | |
|---|---|---|
| EP | 2112472 A2 | 10/2009 |
| EP | 2354752 A1 | 8/2011 |

OTHER PUBLICATIONS

GB Search Report for Application No. GB1312368.2, Nov. 14, 2013. 4 pages.

* cited by examiner

*Primary Examiner* — McDieunel Marc
*Assistant Examiner* — James E Stroud
(74) *Attorney, Agent, or Firm* — Cantor Colburn LLP

(57) ABSTRACT

A device is described herein for determining azimuth comprising a MEMS inertial measurement unit (IMU), a GPS system comprising a GPS antenna and receiver, and a processor configured to receive data from said IMU and from said GPS system, said processor being configured to process said IMU data and said GPS data to derive a true north reference based on said IMU data and said GPS data. A method for determining azimuth is also described herein.

15 Claims, 2 Drawing Sheets

PORTABLE DEVICE FOR DETERMINING AZIMUTH

CROSS REFERENCE TO RELATED APPLICATIONS

This application claims priority to United Kingdom Patent Application No. 1312368.2 filed Jul. 10, 2013, the entire contents of which is incorporated herein by reference.

FIELD OF TECHNOLOGY

A new compassing device for determining azimuth is described herein, and more particularly an azimuth determination device that may be portable and/or hand held.

BACKGROUND

Azimuth is an angular measurement in a spherical coordinate system. The vector from an observer (origin) to a point of interest is projected perpendicularly onto a reference plane; the angle between the projected vector and a reference vector on the reference plane is called the azimuth. A position of a star in the sky can be measured using this concept. In such an example, the reference plane is the horizon or the surface of the sea beneath the point of interest being measured (i.e. the star), and the reference vector points to the north. The azimuth is then the angle between the north vector and the perpendicular projection of the star down onto the horizon. Azimuth is usually measured in degrees (°) and the reference plane for an azimuth in a general navigational context is typically true north, measured as a 0° azimuth. For example, moving clockwise on a 360 degree circle, a point due east would have an azimuth of 90°, south 180°, and west 270°.

The concept may be used in many practical applications including navigation, astronomy, engineering, mapping, mining and artillery. Present hand held azimuth determination (i.e. compassing) devices and methods rely on magnetic sensors to determine azimuth.

Some known devices and techniques for determining azimuth utilise data provided by an inertial measurement unit (IMU). An IMU comprises three accelerometers and three gyroscopes and optionally three magnetometers. The accelerometers are placed such that their measuring axes are orthogonal to each other. They measure inertial acceleration, also known as G-forces. Three gyroscopes are placed in a similar orthogonal pattern, measuring rotational position in reference to an arbitrarily chosen coordinate system. The accelerometers and gyroscopes therefore produce inertial data and in known azimuth determination devices, a processor would normally process the inertial data from the IMU, via strapdown and inertial navigation algorithms, to derive a navigation solution. Other known devices for determining azimuth use GPS systems. Some known handheld devices use magnetic sensors to determine azimuth.

SUMMARY

A device is described herein for determining azimuth comprising a MEMS inertial measurement unit (IMU), a GPS system comprising a GPS antenna and receiver, a processor configured to receive data from said IMU and from said GPS system, said processor being configured to process said IMU data and said GPS data to derive a true north reference based on said IMU data and said GPS data.

A method for determining azimuth is also described herein comprising providing a device that comprises a MEMS inertial measurement unit (IMU), a GPS system and a processor, wherein said GPS system comprises a GPS antenna and receiver, said method further comprising the step of moving said device, and transmitting said IMU data and said GPS data to said processor, and said processor processing said IMU data and said GPS data and deriving a true north reference based on said IMU and GPS data.

The device may be configured to be hand held and may be configured to produce said IMU data and said GPS data due to movement of said device. The movement may comprise oscillatory translation of said device. In some embodiments, the movement may comprise inversion of said device and oscillatory translation of said device.

The IMU data and the GPS data may correspond to first and second independent measurements of the same movement of said device.

The GPS antenna and IMU of the device may be located relative to each other so that they experience the same motion when the device is moved. In some embodiments, they may be located in/on said device.

The GPS antenna and IMU of the device may be located relative to each other and rigidly connected to each other and/or the device so that they experience the same motion when the device is moved.

The GPS antenna and IMU may be located at a distance of 5 cm or less from each other, so that, in use, they experience the same motion when the device is moved.

In some embodiments described herein, the distance between the IMU and the GPS antenna is less than 10% of the oscillatory translation distance and the residual lever-arm effects of any superimposed rotation being corrected.

In some embodiments described herein, the device is configured to produce said IMU data and said GPS data due to movement of said device and wherein said movement comprises oscillatory translation of said device, and further wherein the IMU and the GPS antenna are located relative to each other at a distance that is less than 10% of the oscillatory translation distance.

In some embodiments described herein, the device is configured to produce said IMU data and said GPS data due to movement of said device and wherein said movement comprises inversion of said device and oscillatory translation of said device, and further wherein the IMU and the GPS antenna are located relative to each other at a distance that is less than 10% of the oscillatory translation distance.

In some embodiments, the device may comprise only one GPS antenna.

The GPS data may comprise GPS phase carrier measurements. In some embodiments, the GPS data may also further comprise satellite code data.

The processor may be configured to compare the IMU data with the GPS data to derive the true north reference. In some embodiments, the processor may be configured to integrate the IMU data and compare the integrated IMU data with the GPS data to derive the true north reference.

The IMU of the devices or methods described herein may comprise a six degree of freedom MEMS. In some embodiments, the IMU may comprise three MEMS accelerometers and the data received from the IMU may comprise inertial accelerometer data.

The IMU of the devices and methods described herein may further comprise three MEMS gyroscopes and the data received from the IMU may comprise angular rate data.

In some embodiments, the IMU, GPS receiver and processor of the device described herein may be encapsulated within a first material.

In some embodiments, the first material may be shock resistant. The first material may comprise synthetic resin.

In some embodiments described herein, the step of moving said device may produce said IMU data and said GPS data. In some embodiments, the step of moving said device may comprise creating oscillatory translation of said device. In further embodiments, the step of moving said device may comprise inverting said device and creating oscillatory translation of said device.

In some embodiments described herein, the processor may compare the IMU data with the GPS data to derive the true north reference. In further embodiments, the processor may integrate the IMU data and compare the integrated IMU data with the GPS data to derive the true north reference.

BRIEF DESCRIPTION OF THE DRAWINGS

Examples of an improved azimuth determination device and a new method for detecting true magnetic north are herein described with reference to the accompanying drawings, in which.

DETAILED DESCRIPTION

Figure 1:
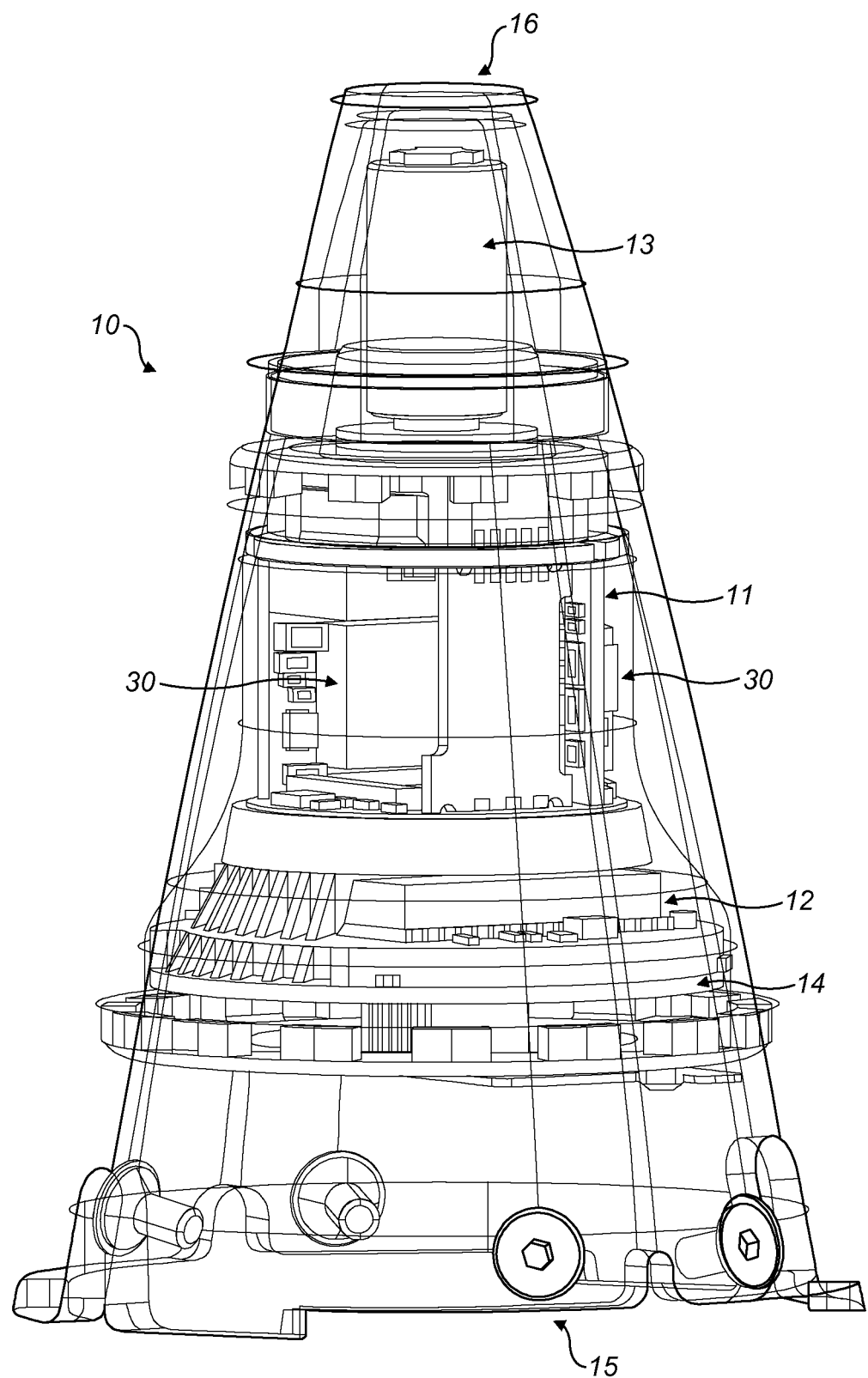
FIG. 1 shows a side view of the internal features of an azimuth determination device as described herein.

FIG. 1 shows a side view of some of the internal features (i.e. the device before encapsulation, as described later) of a first embodiment of a new azimuth determination device, 10, as described herein. The device may be sized and shaped so that it is configured to be handheld. The device may also be used in other portable situations other than being handheld. For example, it may be positioned within a moving boat or vehicle. In the embodiment shown in FIG. 1, the azimuth determination device, 10, comprises a six degree of freedom Microelectromechanical System (MEMS) inertial measurement unit (IMU), 11, comprising three MEMS accelerometers, 20, and three MEMS gyroscopes, 30, as are known in the art. The accelerometers are placed such that their measuring axes are orthogonal to each other. They measure inertial acceleration, also known as G-forces. The gyroscopes are placed in a similar orthogonal pattern, measuring rotational position in reference to an arbitrarily chosen coordinate system.

The device, 10, further comprises a GPS system, such as a high dynamic Global Positioning System (GPS) system, which comprises a GPS receiver, 12, as well a corresponding integral GPS antenna, 13. An example of such a system is the QinetiQ Q20 High Dynamics GPS Receiver Module, which is a high performance and ultra-compact GPS unit. The GPS receiver may incorporate a high stability time reference to enable the required measurement precision.

The device, 10, further comprises a processor, 14. The processor has means for receiving data from the IMU, 11, which may include inertial data from the accelerometer, 20, and/or angular rate data from the gyroscope, 30. A 32 bit floating point DSP processor as is known in the art may be used for this. In the embodiment shown in FIG. 1, the device has a first end, 15, and an opposing second end, 16, and the processor, 14, is provided at the first end, 15, whereas the GPS antenna, 13, is provided at the opposite end, 16. The IMU, 11, and the GPS receiver, 12, are provided therebetween. Alternative positioning of these features may be used, however, and this is just one example of how the features may be arranged.

Figure 2:
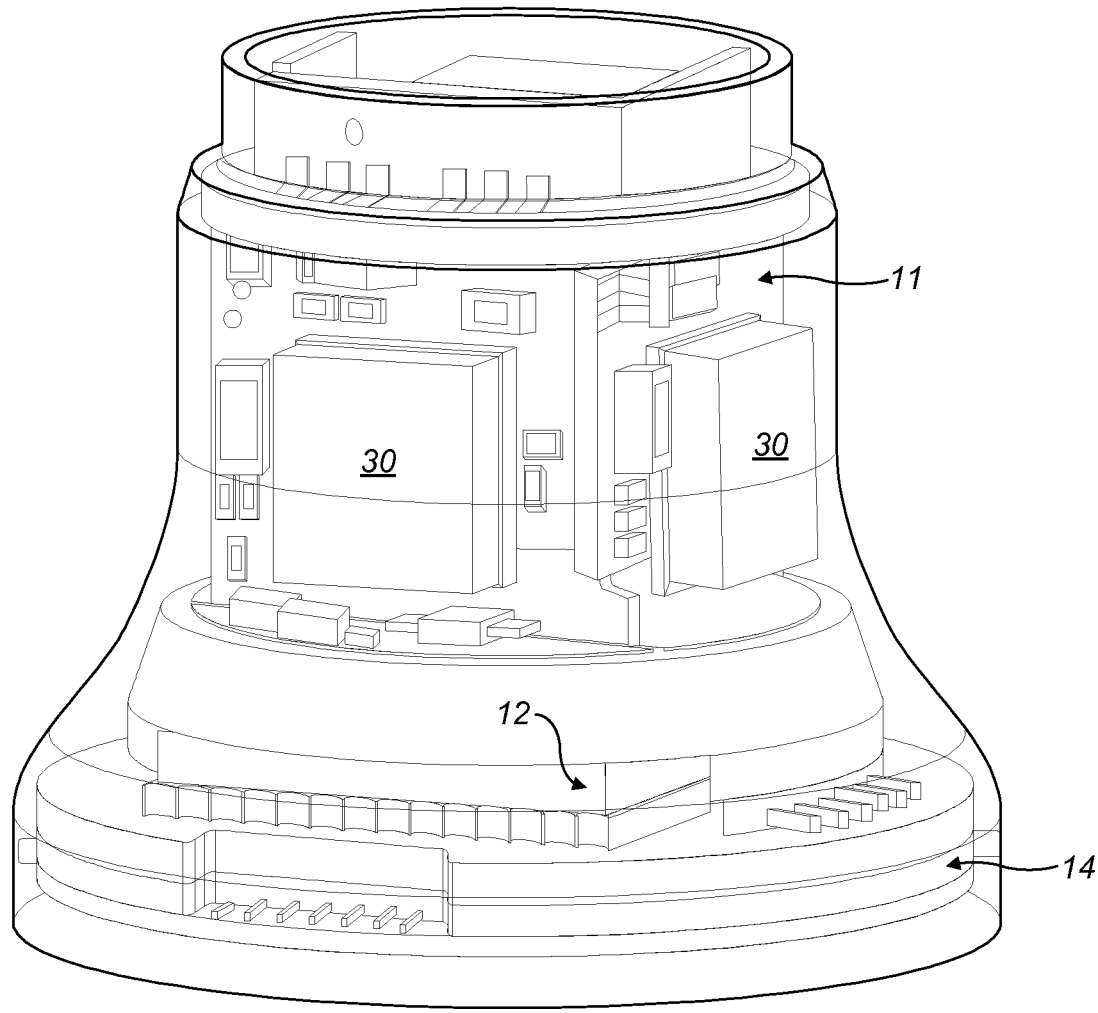
FIG. 2 shows a part of the device of FIG. 1 after it has been encapsulated.

In some embodiments, at least a part of the device, e.g. the IMU, GPS receiver and processor may be encapsulated in a shell to thereby provide a device that is shock tolerant or resistant, so as to prevent damage if dropped or subjected to impact, and to ensure the directional stability of the sensor measurement axes. It may also be constructed to be shock resistant to such an extent that it is capable of withstanding an artillery launch shock. For example, FIG. 2 shows a part of the device of FIG. 1 after it has been encapsulated in a synthetic resin material. In this figure, the GPS antenna, 13, is not shown, however, this would still be present in the device, as in FIG. 1. The accelerometers are also not visible in this figure, but would still be present. Many other different shock resistant materials may alternatively be used to encapsulate the internal features of the device including epoxy resin and polyurethane.

Due to the fact that a MEMS inertial measurement unit is used, the device may be made small enough to have a volume of approximately 35 cubic centimeters and a mass of 75 grams. Devices could of course be made having other volumes and masses and this is just one example of how small and lightweight the device may be. The device can therefore be easily be held in a person's hand and so is very portable.

In use, a simple inversion followed by an oscillatory translation of approximately 0.5 m distance and 1 Hz frequency, which may be readily achieved by hand due to the low volume and mass of the device, provides a sufficient motion input to the IMU, 11. This input may only need be applied temporarily, typically for a period of up to about 10 seconds, in order for the device to provide accurate pointing to be maintained by the un-aided IMU for a period of several minutes. Other types of movement may also be used in order to provide an input to the device. For example, in one embodiment only oscillatory translation may be used, with no inversion.

The processor of the device described herein further comprises means for receiving data from the GPS system. The GPS data may comprise carrier phase measurements but may also additionally comprise GPS satellite code measurements. The processor of the device described herein may then compare the IMU data with the GPS data to accurately determine the orientation of the IMU, 11, with respect to true north.

Specifically, this is achieved by using two independent measures of the oscillatory motion introduced by the user: the IMU sensed accelerations are integrated to derive velocity in the IMU frame of reference, whilst concurrent GPS carrier phase data are used to measure position changes, with successive measurements being differenced to derive the associated velocity with respect to true North; the distance between the IMU and the GPS antenna being less than 10% of the oscillatory translation distance and the residual lever-arm effects of any superimposed rotation being corrected. The difference between the two measures of the same oscillatory motion in the different frames of reference indicates the relationship between these frames of reference and hence provides an estimate of the error in the system azimuth angle. The system azimuth angle is otherwise maintained by continuous integration of the IMU gyro data, with progressive corrections applied from the error estimates to refine its accuracy.

In some embodiments described herein, the GPS antenna and IMU of the device may be located relative to each other in such a way that, in use, the GPS antenna and IMU experience the same motion when the device is moved. In some embodiments, this may be achieved by rigidly connected these to each other and/or the device so that they experience the same motion when the device is moved.

The close physical relationship between the inertial sensors and the GPS antenna, combined with the use of a stable frequency reference for the GPS receiver, allows precise carrier phase GPS measurements to be used; this then permits the correlation process to converge supported only by the small scale motion described above.

This differs from known techniques of determining azimuth in that known devices normally operate by processing the GPS measurements of range, with an accuracy of a few meters, and range rate, with an accuracy of about a tenth of a metre per second. Although these measurements work well to detect most of the system error states, the mechanism for azimuth error detection requires a horizontal acceleration generating a displacement which is significant in relation to the GPS errors, i.e. several meters per second of velocity or several tens of meters of position. The device described herein is not reliant upon such motion due to the short distance between the IMU and the GPS antenna, and the stability of the frequency reference, allowing GPS Carrier Phase measurements to supplement GPS range and range rate data.

As described above, the processor of the device described herein may combine and compare IMU data with GPS carrier phase data to accurately determine azimuth. Carrier Phase measurements provide a very high relative position resolution, in the order of a few millimeters. In known systems, multiple antennas are normally used to simultaneously measure the phase difference from at least two points, and therefore determine the angle of those points in relation to the reference datum, i.e. due north. In an embodiment of the devices and techniques described herein, however, the data (e.g. carrier phase data) from the GPS system may be combined and compared with the IMU data and applied as Kalman filter measurements to the inertial navigation system. In such an embodiment, there is therefore no longer a reliance upon simultaneous measurements from two points as the IMU of the device described herein provides accurate short term position tracking of the single antenna as it is displaced.

In addition to the above, the device described herein exploits the close physical relationship between the IMU, 11, and the GPS antenna, 13 to provide the advantageous effects. For example, the antenna and the IMU of the device described herein are provided within/on the same small, handheld device and are located only a few cm apart from each other. In one embodiment, the GPS antenna phase centre may only be located 2 cm from the inertial centre of measurement of the IMU, 11. In other embodiments the distance between the IMU and the GPS antenna may be greater, but preferably less than 5 cm. This has significant advantages in that the antenna and IMU therefore experience the same motion, which results in any potential errors due to differential motion being very small.

In some embodiments, in use, the device may be attached to a larger host system, and may be temporarily removed to allow motion to be used to condition the Kalman filter—the required motion being a single or repeated inversion to observe accelerometer errors, then a single or repeated displacement of approximately 0.5 meters to observe the azimuth error.

In view of the above, the device and method has significant advantages over known devices and methods, such as those that rely on magnetic sensors to determine azimuth. This is because the accuracy of such magnetic sensors is limited by magnetic declination as they are susceptible to interference from nearby magnetic influences as well as variation between magnetic and true north.

The new device and method described herein also has further advantages in that it is small enough to be handheld and operates due to simple hand movements. The processing of the combination of GPS data, and in particular carrier phase data with inertial data also further provides an accurate true north reference, using only a single GPS antenna. This is unlike known systems which use multiple GPS antennas or require more significant vehicle-borne motion, as described above.

The device is also able to provide wireless communication for unpowered data transfer using an ISO 15693 vicinity protocol; this allows any necessary mission data to be transferred to the device before any external power is applied.

The invention claimed is:

1. A device for determining azimuth comprising:
 a MEMS inertial measurement unit (IMU),
 a GPS system comprising a GPS antenna and receiver
 a processor configured to receive data from said IMU and from said GPS system, said processor being configured to process said IMU data and said GPS data to derive a true north reference based on said IMU data and said GPS data;
 wherein said GPS antenna and said IMU are rigidly connected to each other and located at a distance of 5 cm or less from each other so that they experience the same motion when said device is moved; and
 wherein said processor is configured to compare said IMU data with said GPS data to derive said true north reference.

2. The device of claim 1 wherein said device is configured to be hand held.

3. The device of claim 1 wherein said device is configured to produce said IMU data and said GPS data due to movement of said device.

4. The device of claim 3 wherein said movement comprises oscillatory translation of said device.

5. The device of claim 3 wherein said movement comprises inversion of said device and oscillatory translation of said device.

6. The device of claim 3 wherein said IMU data and said GPS data correspond to first and second independent measurements of the same movement of said device.

7. The device of claim 1 wherein said IMU comprises three MEMS accelerometers and said data received from said IMU comprises inertial accelerometer data.

8. The device of claim 1 wherein said IMU comprises three MEMS gyroscopes and said data received from said IMU comprises angular rate data.

9. A method for determining azimuth comprising
 providing a device that comprises a MEMS inertial measurement unit (IMU), a GPS system and a processor,
 wherein said GPS system comprises a GPS antenna and receiver, wherein said GPS antenna and said IMU are rigidly connected to each other and located at a distance of 5 cm or less from each other so that they experience the same motion when said device is moved,
 said method further comprising the steps of moving said device, and
 transmitting said IMU data and said GPS data to said processor,
 and said processor processing said IMU data and said GPS data and deriving a true north reference based on said IMU and GPS data.

10. The method of claim 9 wherein said step of moving said device comprises creating oscillatory translation of said device.

11. The method of claim 10, wherein said step of moving said device comprises inverting said device and creating oscillatory translation of said device.

12. The method of claim 9 wherein said GPS data comprises GPS phase carrier measurements.

13. The method of claim 12 wherein said GPS data further comprises satellite code data.

14. The method of claim 9, comprising the step of comparing said IMU data with said GPS data to derive said true north reference.

15. The method of claim 9 comprising the step of integrating said IMU data and comparing said integrated IMU data with said GPS data to derive said true north reference.

* * * * *